(12) United States Patent
Lo et al.

(10) Patent No.: US 12,045,306 B2
(45) Date of Patent: Jul. 23, 2024

(54) MULTIPLIER WITH ZERO SKIPPING

(71) Applicant: Vivante Corporation, San Jose, CA (US)

(72) Inventors: Mankit Lo, San Jose, CA (US); Wei-Lun Kao, San Jose, CA (US); Yizhong Yang, San Jose, CA (US)

(73) Assignees: VeriSilicon Microelectronics (Shanghai) Co., Ltd., Shanghai (CN); VeriSilicon Holdings Co., Ltd., George Town (KY)

( * ) Notice: Subject to any disclaimer, the term of this patent is extended or adjusted under 35 U.S.C. 154(b) by 235 days.

(21) Appl. No.: 16/844,301

(22) Filed: Apr. 9, 2020

(65) Prior Publication Data

US 2021/0318887 A1 Oct. 14, 2021

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
CPC .......... G06F 17/16; G06F 17/15; G06F 7/523; G06F 7/5443; G06N 3/063
See application file for complete search history.

(56) References Cited

U.S. PATENT DOCUMENTS

| | | | |
|---|---|---|---|
| 2017/0316312 A1 | 11/2017 | Goyal et al. | |
| 2017/0344876 A1* | 11/2017 | Brothers | G06N 3/04 |
| 2018/0046898 A1* | 2/2018 | Lo | G06N 3/063 |
| 2019/0012296 A1* | 1/2019 | Hsieh | G06N 3/0445 |
| 2019/0065150 A1* | 2/2019 | Heddes | G06N 3/0445 |
| 2019/0115933 A1* | 4/2019 | Chen | G06N 3/04 |
| 2019/0121837 A1* | 4/2019 | Azizi | G06F 9/3001 |
| 2020/0210819 A1* | 7/2020 | Jang | G06N 3/04 |
| 2020/0218978 A1* | 7/2020 | Kopinsky | G06F 17/16 |
| 2020/0293858 A1* | 9/2020 | Das | G06N 3/04 |
| 2020/0326938 A1* | 10/2020 | Liu | G06F 17/16 |

OTHER PUBLICATIONS

D. Patterson., Computer Organization and Design, The hardware/software interface, Fourth Edition, Elsevier 2008, section 5.2 p. 459, figure 5.5 (Year: 2008).*
Heien, Understanding Long-Term Earthquake Behavior through Simulation, Computational Earthquake Science, Sep./Oct. 2012, University of California Davis.

* cited by examiner

*Primary Examiner* — Jyoti Mehta
*Assistant Examiner* — Huy Duong
(74) *Attorney, Agent, or Firm* — David R. Stevens; Stevens Law Group

(57) ABSTRACT

A system performs matrix multiplication of a vector by a two-dimensional matrix by evaluating whether the vector includes zero values. Rows of the matrix are loaded into a first memory device from a second device. Rows corresponding to the indexes of the zero values are not loaded. A dot product of columns of the matrix and the input vector is performed and stored. The matrix may be stored in the second memory device such that only entries for non-zero entries are stored. The rows of the matrix may be reconstructed in the first memory device from these entries.

7 Claims, 4 Drawing Sheets

MULTIPLIER WITH ZERO SKIPPING

RELATED APPLICATIONS

This application is related to the following applications, all of which are hereby incorporated herein by reference in their entirety:

U.S. Patent Application No. 62/373,518, filed Aug. 11, 2016, and entitled "Zero Coefficient Skipping Convolution Neural Network Engine", and U.S. patent application Ser. No. 15/671,829, filed Aug. 8, 2017, and entitled "Zero Coefficient Skipping Convolution Neural Network Engine", and U.S. patent application Ser. No. 15/671,860, filed Aug. 8, 2017, and entitled "Zero Coefficient Skipping Convolution Neural Network Engine".

BACKGROUND

Field of the Invention

This invention relates to systems and methods for performing matrix multiplication, dot products, or other multiply/accumulate operations.

Background of the Invention

Many graphics processing applications rely on matrix multiplication of one form or another. Matrix multiplication is also part of many mathematical problems that lend themselves to computational solutions. In many applications of matrix multiplication, particularly for graphics processing and artificial intelligence, the matrices involved may be very large, such as on the order of many thousands of rows and columns.

The systems and methods disclosed herein provide an improved approach for implementing matrix multiplication with a computing device.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
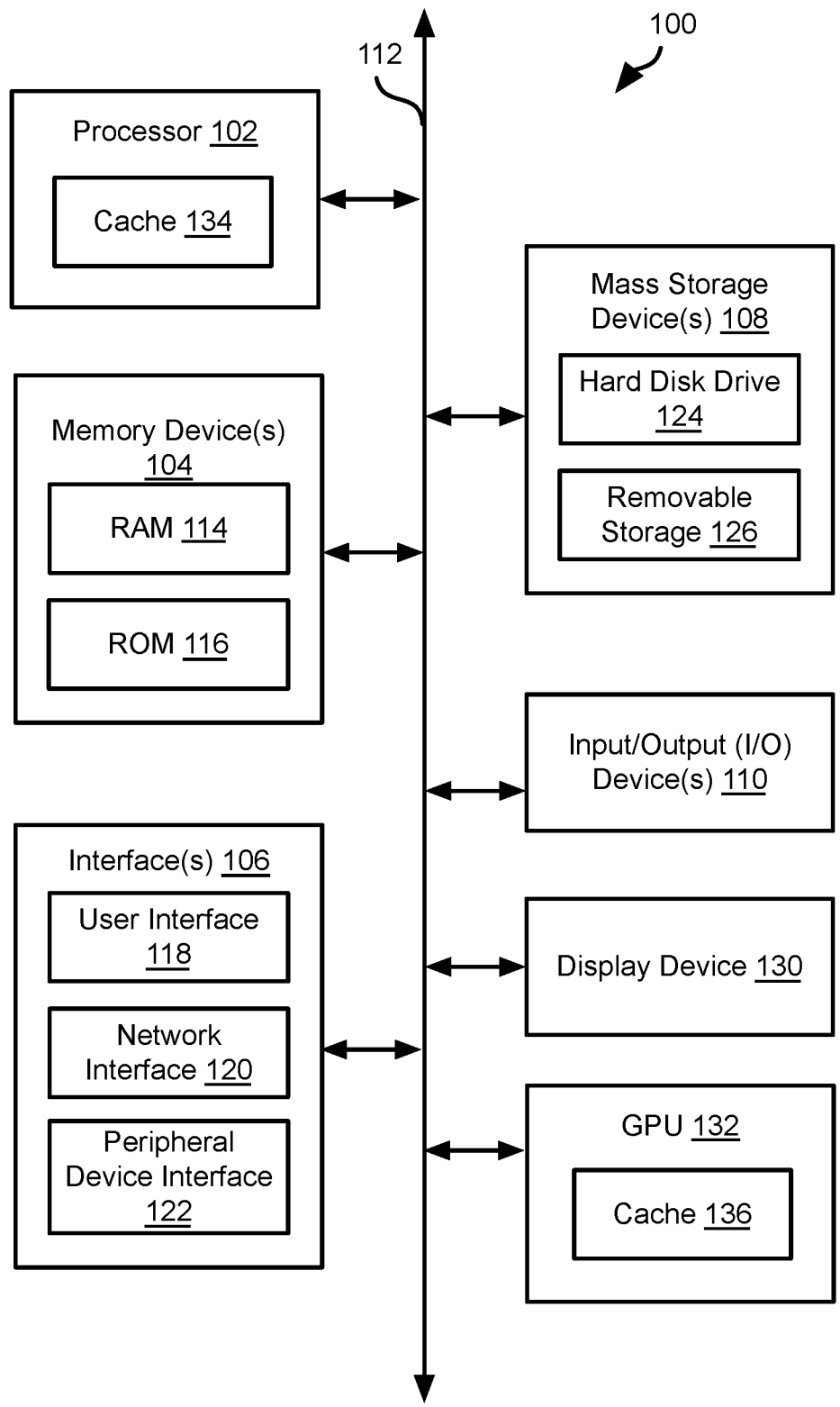
FIG. 1 is a diagram of a computing device in which the systems and methods disclosed herein may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can incorporate a circuit performing the methods disclosed herein, and can execute one or more application programs, such as the application programs that invoke the methods disclosed herein to calculate trigonometric functions. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In some embodiments, a processor 102 may include a cache 134, such as one or both of a L1 cache and an L2 cache. A GPU 132 may likewise include a cache 136 that may likewise include one or both of a L1 cache and an L2 cache. The processor 102 and GPU 132 may include circuits or be otherwise programmed to perform matrix multiplication using the cache 134, 136 as described below.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
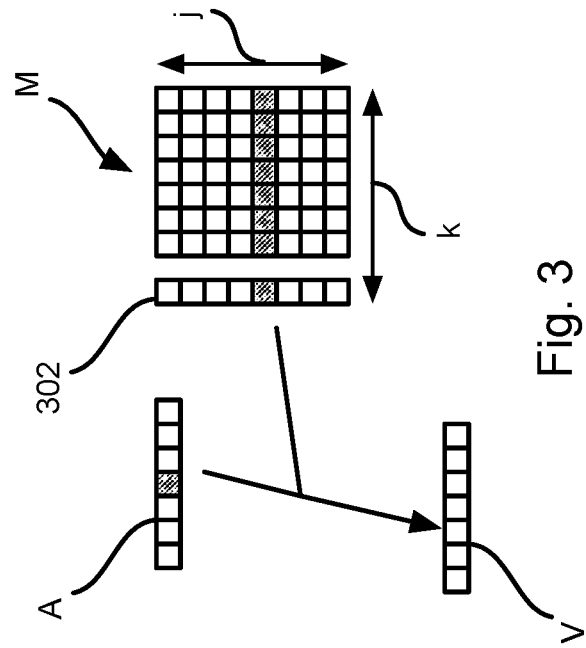
FIG. 3 is a diagram illustrating an improved approach for matrix multiplication in accordance with an embodiment of the present invention.
Figure 2:
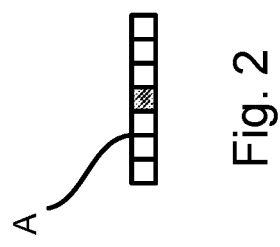
FIG. 2 illustrates an example application for the methods disclosed herein.

Referring to FIG. 2, a vector A may include one or more elements that are zeros. The vector A may be a row of pixels from an image, a set of samples of an audio signal, or any other vector of values that may be subject to matrix multiplication As shown in FIG. 3, a vector A may be multiplied by a matrix M, i.e., a two dimensional array of values. In the illustrated example, the matrix M includes a row dimension j and a column dimension k. Each column 302 of the matrix M may be multiplied by the vector A, such as by performing a dot product operation in which each element at a vector index in the vector A is multiplied by an element in the column 302 having a row index equal to the vector index to obtain a product. The products for all of the vector indexes are then summed to obtain the final results, which includes an output vector V having a number of elements equal to the number of columns in M.

FIGS. 2 and 3 illustrate one example of an operation that may be improved according to the methods disclosed herein. In some embodiments, the vector A may be a set of samples from an audio signal or other sampled signal. In particular, the methods disclosed herein may be applied in any application where a vector is multiplied by a matrix. The methods disclosed herein are particularly useful for very large vectors and matrixes, e.g. vectors with 1000 or more elements and matrixes with 1000 or more rows.

As shown in FIG. 3, one or more elements of the vector A may be zero, shown by the stippled element. In some applications, zero-valued elements may be common in the input vectors A, particularly for machine learning applications, such as neural networks. As a result of this, the stippled row of the matrix M will have no effect on the matrix multiplication. In many applications, the time spent retrieving the matrix M from memory is a significant source of the latency of the matrix multiplication. Accordingly, as will be described in greater detail below, loading of rows having indexes corresponding to zero-valued elements of the vector A is omitted.

Figure 4:
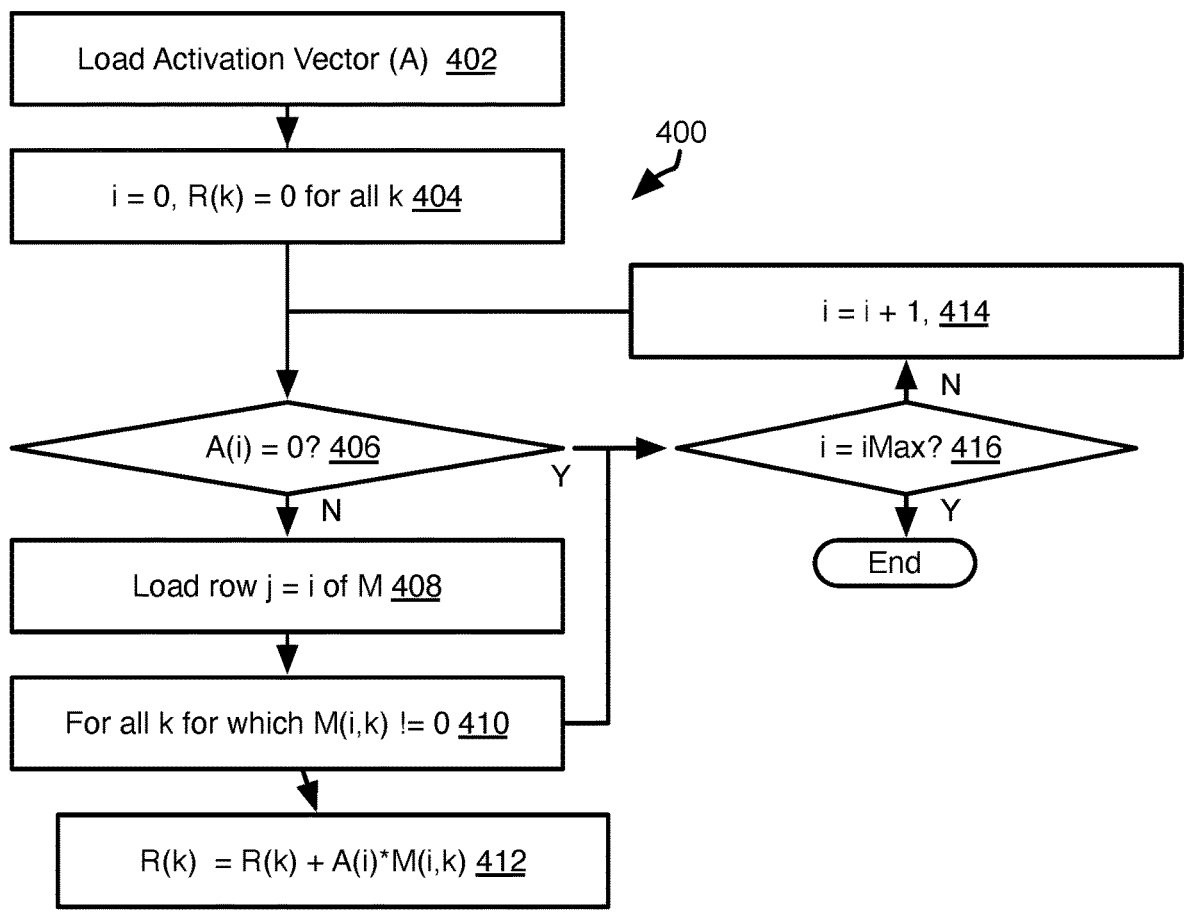
FIG. 4 is a process flow diagram of a method for performing matrix multiplication in accordance with an embodiment of the present invention.

FIG. 4 illustrates an example method 400 for performing matrix multiplication in a manner that takes into account zero-valued elements of the vector A. The method 400 may be executed by the processor 102, the GPU 132, or other processing device.

The method 400 may include loading 402 an activation vector A into a first memory device from a second memory device. For example, the second memory device may be RAM 114 and the first memory device may be a cache 134, 136. In other embodiments, the second memory device is a mass storage device 108 and the first memory device is a cache 134, 136 or RAM 114. In other embodiments, the first memory device is an L1 cache and the second memory is an L2 cache.

An index i may be initialized 404 to zero. The index i corresponds to the element A(i) of the activation vector A and the corresponding column index j=i of the matrix M that are to be multiplied by that element. Step 404 may include initializing a set of accumulators R(k) to be zero, where the number of accumulators is equal to the number of columns of M such that R(k=j) corresponds to column j of M.

If element A(i) is found 406 to not be equal to zero, then the role j=i of the Matrix M is loaded 408 from the second memory device into the first memory device.

In some embodiments, the matrix M may be compressed such that step 408 may include decompressing the row j of the matrix M and storing the decompressed row in the first memory device.

In some embodiments, the matrix M may be stored in the form of a plurality of entries such that each entry if of the form <row index><column index><element value>. In this manner, the space required to store a sparse matrix is reduced. Accordingly, loading at step 408 may include either (a) loading these entries into the first memory device. For example, a location in a line of memory corresponding to the column index of an element of the row may be populated with the data corresponding to that column index and the row j. Rows of the matrix M may be compressed individually such that individual rows may be decompressed and loaded. As is apparent from FIG. 4, where A(i)=0, there will be no attempt to load row j=i of the matrix M.

The method 400 may include processing 410 each element M(j,k), k=0 to kMax, of row j either in parallel or in series, where IMax is the number of columns of M minus 1. In particular, for each value of k, the accumulator R(k) may be set equal to the current value of R(k) plus A(i)*M (i,k) at step 412. Where the processing 410 is done in series, step 412 may be omitted for values of k where M(i,k) is equal to zero. In some embodiments, where processing 410 is done in parallel, step 412 is also omitted for those values of k for which M(i,k) is equal to zero. Where the processing 410 is done in parallel, an array of multiply accumulators may be used, one for each column k such that step 412 is performed for each value of k by one of the multiply accumulators.

Following processing according to step 410 and in cases where A(i) is found to be zero, the method may include evaluating whether i is equal to iMax (the number of elements in A minus one). If not, i is incremented at step 414 and processing continues at step 406. If so, then the method ends and the values in the accumulators R(k) are a vector representing the result of the matrix multiplication A·M as shown in FIG. 3.

Figure 5:
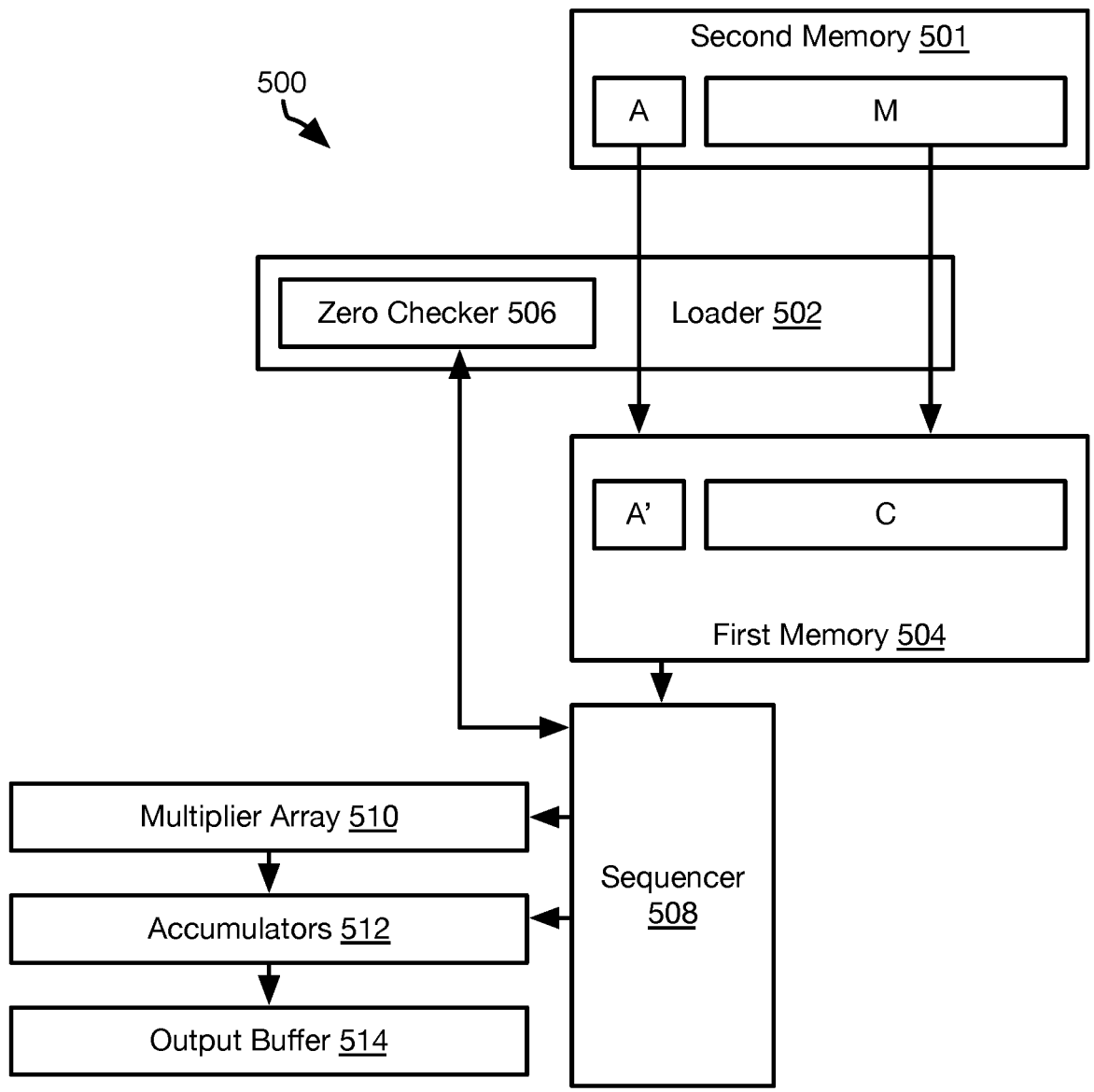
FIG. 5 is a schematic block diagram of an alternative architecture for performing matrix multiplication in accordance with an embodiment of the present invention.

Referring to FIG. 5, the illustrated architecture 500 may be used to perform matrix multiplication such that the multiplications for each column of C is parallelized.

As shown in FIG. 5, the activation vector A and matrix M may be initially stored in the second memory 501. A loader 502 loads A and some or all of M into the first memory 504. The loader 502 may include a zero checker 506 that evaluates the values of A as part of the loading process (see step 408 of FIG. 4). The loader 502 may store A as A' in the first memory 504 such that A' does not include the zero-valued elements. Accordingly, where A has B zero-valued elements, A' will only have N-B elements. Where M is compressed, the loader 502 may decompress the rows of M that are retrieved. As described above for the method 400, only those rows of M that do not correspond to the zero indexes of A are loaded.

The element values of each entry in a loaded row may be stored in the column position indicated in the <column> index field for that entry. In other embodiments, the entries of a row are stored in the <row index><column index><element value> format.

A sequencer 508 may manage performance of matrix multiplication. For example, by loading the elements of A' as the first arguments of an array of multipliers 510. The sequencer 508 may load a row of M as the second arguments of the array of multipliers 510 as part of performing step 412 for that row. The array of multipliers 510 performs the multiplication and the products are input to accumulators 512, i.e. an accumulator for each column of M, which add the output of the multiplier to the current value of the accumulator. The sequencer 508 may instruct which multiplier outputs to sum: only the outputs of multipliers into which an element of A' was loaded as a first argument and only the outputs of multipliers for which the an element of M loaded as the second argument is non-zero. The outputs of the accumulators 512 may be written to an output buffer 514 and used according to any method known in the art for using matrix multiplication.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:

1. A system comprising:
a multiplier array;
an accumulator;
a first memory;
a second memory having higher capacity and slower access time than the first memory; and
a plurality of components comprising:
   a loader configured to:
      identify one or more zero index positions in an input vector for which values of the input vector at the one or more zero index positions are zero; and
      load from the second memory into the first memory, a portion of a two-dimensional array defining a first dimension and a second dimension, wherein the portion includes zero and non-zero values, the portion not including values of the two-dimensional array having first indexes in the first dimension matching the one or more zero index positions; and
   a sequencer configured to manage performance of matrix multiplications by sequentially loading each non-zero element of the input vector and each row of the portion of the two-dimensional array into the multiplier array and instruct the accumulator to add outputs of the multiplier array only for non-zero values of each row of the portion of the two-dimensional array.

2. The system of claim 1, wherein the sequencer is programmed to manage performance of matrix multiplication by, for the two-dimensional array designated as M and the input vector designated as A:
   setting i=0 and performing (a) and (b) until i is equal to a dimension of the two-dimensional array in the second dimension and setting accumulators R(k)=0 for k=0 to kMax−1, where kMax is a number of elements of the two-dimensional array in the second dimension, wherein (a) and (b) include:
      (a) when A(i) is not equal to zero, calculating R(k) for k=0 to (kMax−1) as R(k)=R(k)+A(i)*M(i,k); and
      (b) incrementing i by one.

3. The system of claim 1, wherein the loader is further programmed to obtain the input vector by retrieving a row of pixels from an image of a set of images.

4. The system of claim 1, wherein the loader is further programmed to obtain the input vector as a set of samples from an audio signal.

5. The system of claim 1, wherein the loader is further programmed to obtain the portion of the two-dimensional array from a plurality of entries, each entry including a first index and a second index for a non-zero value in the two-dimensional array.

6. The system of claim 5, wherein the loader is further programmed to obtain the plurality of entries by decompressing the portion of the two-dimensional array.

7. The system of claim 1, wherein the first memory is a cache on a chip including a processing device and the second memory is a random access memory (RAM).

* * * * *